(12) United States Patent
Ge (10) Patent No.: US 9,689,335 B2
(45) Date of Patent: Jun. 27, 2017

(54) ENGINE MASS AIR FLOW CALCULATION METHOD AND SYSTEM

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 106 days.

(21) Appl. No.: 14/696,991

(22) Filed: Apr. 27, 2015

(65) Prior Publication Data

US 2016/0312728 A1 Oct. 27, 2016

(51) Int. Cl.

| F02D 41/18 | (2006.01) |
|---|---|
| F02D 41/00 | (2006.01) |
| F02D 41/10 | (2006.01) |
| F02D 41/14 | (2006.01) |
| F02D 41/22 | (2006.01) |
| F02D 23/02 | (2006.01) |
| F02D 13/02 | (2006.01) |
| F02M 26/05 | (2016.01) |

(52) U.S. Cl.
CPC ............ *F02D 41/18* (2013.01); *F02D 23/02* (2013.01); *F02D 41/0007* (2013.01); *F02D 41/107* (2013.01); *F02D 41/1454* (2013.01); *F02D 41/222* (2013.01); *F02D 13/0219* (2013.01); *F02D 2200/0402* (2013.01); *F02D 2200/0404* (2013.01); *F02D 2200/0406* (2013.01); *F02M 26/05* (2016.02)

(58) Field of Classification Search
CPC ............ F02D 41/18; F02D 2200/0402; F02D 41/0007; F02D 2200/0406; Y02T 10/144; Y02T 10/42
See application file for complete search history.

(56) References Cited

U.S. PATENT DOCUMENTS

| 5,925,089 | A | 7/1999 | Fujime | |
|---|---|---|---|---|
| 6,035,640 | A | 3/2000 | Kolmanovsky et al. | |
| 7,458,361 | B2 | 12/2008 | Wild | |
| 7,748,362 | B2 | 7/2010 | Whitney et al. | |
| 7,814,752 | B2 | 10/2010 | Hu | |
| 8,880,321 | B2 | 11/2014 | Sun et al. | |
| 2006/0225710 | A1* | 10/2006 | Taglialatela-Scafati | F02D 35/023 123/486 |
| 2011/0295525 | A1* | 12/2011 | Tsukamoto | F02D 41/18 702/47 |
| 2012/0137678 | A1* | 6/2012 | Brahma | F02B 37/12 60/605.1 |
| 2012/0173118 | A1 | 7/2012 | Wang et al. | |
| 2013/0061831 | A1 | 3/2013 | Gambhir et al. | |
| 2014/0076279 | A1 | 3/2014 | Livshiz et al. | |
| 2014/0116376 | A1 | 5/2014 | Hagari | |
| 2015/0337720 | A1* | 11/2015 | Cattani | F02B 37/24 60/605.1 |

* cited by examiner

*Primary Examiner* — Sizo Vilakazi
(74) *Attorney, Agent, or Firm* — Leydig, Voit & Mayer, LTD.

(57) ABSTRACT

A system and method for determining an engine mass air flow (MAF) for use in an engine air to fuel ratio (AFR) calculation to operate an engine includes monitoring engine operation, determining in the electronic controller a first estimation of engine MAF based on a regression model, determining in the electronic controller a second estimation of engine MAF based on a flow model, and selecting the first or second estimation of engine MAF based on an operating state of the engine. Each estimation can use various engine parameters interchangeably to provide a robust system against sensor failures.

19 Claims, 5 Drawing Sheets

ENGINE MASS AIR FLOW CALCULATION METHOD AND SYSTEM

TECHNICAL FIELD

This patent disclosure relates generally to internal combustion engines and, more particularly, to systems and methods for controlling engine operation, and specifically controlling an air to fuel ratio within engine cylinders during steady-state and transient operation.

BACKGROUND

Internal combustion engines have many components that can affect the reliable and efficient operation of the engine. Engine operation and performance may be especially affected by the condition of those components that are associated with the engine's combustion cylinders such as intake and exhaust valves, piston rings, head gaskets and the like, as well as the various sensors that provide information to one or more controllers that control the operation of various actuators on the engine. Sensor information specifically can affect the ratio of fuel and air provided to an engine cylinder during operation, which can affect the engine's performance both in terms of power as well as in terms of emissions, which, in many countries, are regulated. The reliable control of the engine's air/fuel ratio is especially important in engines operating close to a stoichiometric air/fuel ratio, such as homogeneous combustion engines.

Homogeneous combustion engines, such as engines operating with a gaseous fuel or engines operating on more than one fuel, e.g., dual fuel engines and homogeneous charge compression ignition engine, requires controlling the engine's air to fuel ratio (AFR) accurately so that the engine can provide the intended power while also meeting emission regulations. In a typical engine, the AFR is continuously calculated, in real time, based on the amount of air ingested by the engine and the amount of fuel injected directly or indirectly into the engine cylinders. In the past, an indication of the mass air flow (MAF) of an engine has been determined directly, for example, by use of dedicated MAF sensors, or indirectly, for example, by a calculation based on readings from intake-manifold pressure sensors of the engine. To control the MAF of the engine, various devices such as intake throttles have also been used. A typical intake throttle valve may be controlled by an engine Electric Control Module (ECM) to adjust the MAF. In typical engines, however, there are important technical challenges in controlling MAF effectively to this achieve a desired AFR.

One technical challenge concerns transient engine events, which, as used here, describe periods of changing speed and/or load of an engine. During a transient event, the pressure and temperature sensors that may be associated with the intake manifold and used to determine MAF, or even a MAF sensor, will take a certain period of time to update their readings of the transiently changing engine MAF. Such a time lag may depend on various factors including sampling frequency of the sensors involved, response time of those sensors, the extent and rate of the transient change in MAF, and other factors.

When operating in a transient condition, especially for engines that provide fuel to the cylinders indirectly such as by fumigation of a gaseous fuel in the engine's intake manifold, some engine controllers may command a fuel injection before the closure of an intake valve. When the intake valve closes, the MAF into the cylinder can be more accurately determined based on the profile of the MAF sensor's readings. To improve the combustion process, an engine controller may sometimes be configured to allot a preset time period before intake valve closure to inject the fuel and to permit enough time for a thorough mixing of the air and fuel. In such conditions, it can be appreciated that the MAF must be determined or estimated while the intake valve is still open, because the amount of fuel that will be delivered must depend on this estimation. In other words, a control logic for delivering a desired AFR is tasked, in known engines, with providing a MAF estimation at the beginning of fuel injection during a transient event. The accuracy of this estimation directly affects the accuracy of the resulting AFR control.

Another technical challenge is that modern engines include more than one actuated components and system that can affect AFR control. In addition to a throttle valve discussed above, a typical engine may also include an exhaust gas recirculation (EGR) valve, a compressor bypass valve, a turbine waste-gate valve, each of which can affect the amount of fresh air ingested by the engine. An AFR control must thus consider the effect valves in addition to the intake throttle valve may have on the engine MAF, and also estimate that effect to avoid errors during transient operation, when most of these other valves will be operating and changing positions.

Yet another technical challenge may arise in the event of an in-range or an out-of-range failure of one or more engine sensors contributing information to an AFR control. Whenever there is a failure of an engine sensor that is implicated in AFR control, typical engine diagnostic algorithms will identify the failure and will typically impose a limp-home or reduced-power operating mode of the engine. For certain critical tasks, a back-up engine or engines are typically utilized to ensure the continuous power supply to avoid a power drop due to an engine assuming a reduced-power mode of operation because of an engine failure. However, such measures may not be acceptable for critical engine applications, and may create inconvenience and loss of productivity even for non-critical applications.

One past attempt to address these issues can be seen in U.S. Pat. No. 7,458,361 ("Wild"). The Wild references addresses the issue of accurate MAF estimation by using a "setpoint quantity" of air, which precedes an "actual quantity" of air during transient operation. According to Wild, the setpoint quantity can be used to predict the actual quantity by correcting the setpoint quantity characterizing the setpoint air charge in such a way that the predicted quantity agrees in a steady state with an actual quantity characterizing an actual air charge, at least within a tolerance range. The Wild reference also includes providing the setpoint quantity characterizing the setpoint air charge to a first shaping network, which portrays a dynamic response of at least one region of the intake manifold, at least within a tolerance range. However, Wild discloses a single output algorithm, which can be used to control a single actuator such as an intake throttle, which would be an ineffective solution for most modern engines having additional actuators that can affect MAF such as EGR, compressor bypass, turbine waste-gate valves and the like.

Another past attempt can be seen in U.S. Pat. No. 7,814,752 ("Hu"). Hu introduces a fluid control system that can utilize the decoupled control algorithm to adjust throttle valve, EGR valve, compressor bypass valve and turbine waste-gate valve. However, the strategy used by Hu's system is almost entirely based on interpolation maps that use sensor inputs. In the event of failure of the sensor providing the information required to interpolate values on the map, the system would be rendered inoperative.

Lastly, another past attempt at addressing these issues can be seen in U.S. Patent Application Pub. No. 2012/0173118 ("Wang"). Wang describes a multiple input, multiple output (MIMO) system with coupled input-output response loops. In a typical feed forward control frame, a great amount of maps have to be populated and validated to provide accurate control for engine MAF and EGR. Wang uses model-based approaches, which include an inverse flow model or an inverse of a physical model of a system to determine those system settings required to achieve a desired flow. However, the system of Wang is still susceptible to loss of functionality in the event of a sensor failure, for example, in the position sensor or pressure sensor, because both those sensors are necessary inputs to the control strategy.

SUMMARY

In one aspect, the disclosure describes a method for determining an engine mass air flow (MAF) for use in an engine air to fuel ratio (AFR) calculation to operate an engine. The method includes monitoring engine operation, with an electronic controller, a first group of engine parameters, each of which is related to fluid pressures at various engine locations, and a second group of engine parameters, each of which is related to valve positions of various engine actuators. The method further includes determining in the electronic controller a first estimation of engine MAF based on one parameter from the first group of engine parameters, determining in the electronic controller a second estimation of engine MAF based on one parameter from the second group of engine parameters, determining in the electronic controller an operating state of the engine, the operating state of the engine being determined as steady-state or transient, and selecting one of the first estimation of engine MAF and the second estimation of engine MAF based on the operating state of the engine. The selected first or second estimation of engine MAF is used in the AFR calculation in the controller to control the engine.

In another aspect, the disclosure describes an internal combustion engine having at least one cylinder fluidly connectable between an intake manifold and an exhaust collector. The engine further includes a turbocharger having a compressor in fluid communication with the intake manifold and a turbine in fluid communication with the exhaust collector, a compressor bypass valve disposed to fluidly bypass the compressor, the compressor bypass valve being associated with a compressor bypass valve actuator responsive to a compressor bypass command signal and providing a compressor bypass position signal being indicative of an operating position of the compressor bypass valve, a waste-gate valve disposed to fluidly bypass the turbine, the waste-gate valve being associated with a waste-gate valve actuator responsive to a waste-gate command signal and providing a waste-gate position signal being indicative of an operating position of the waste-gate valve, and an intake throttle valve disposed in fluid communication with the intake manifold and the compressor, the intake throttle valve being associated with an intake throttle actuator responsive to an intake throttle command signal and providing an intake throttle position signal being indicative of an operating position of the intake throttle valve. The engine also has a compressor outlet pressure sensor providing a compressor outlet pressure signal, an intake throttle pressure sensor providing an intake throttle pressure signal, an intake manifold pressure sensor providing an intake manifold pressure signal, and an intake manifold temperature sensor providing an intake manifold temperature signal.

A controller associated with the engine is programmed to receive and monitor the compressor bypass position signal, the waste-gate position signal, the intake throttle position signal, the compressor outlet pressure signal, the intake throttle pressure signal, and the intake manifold temperature signal. The controller is disposed to determine a first estimation of engine MAF based on one of the compressor outlet pressure signal, the intake throttle pressure signal, the intake manifold pressure signal, and also the intake manifold pressure signal using a regression map, calculate a pressure difference across the compressor and a pressure difference across the intake throttle based on the compressor outlet pressure signal, the intake throttle pressure signal, and the intake manifold pressure signal, determine a second estimation of engine MAF based on one of the pressure difference across the compressor and a pressure difference across the intake throttle, along with one of the compressor bypass position signal and the waste-gate position signal using a preprogrammed flow model, and determine an operating state of the engine as between a steady-state operating mode and a transient operating mode. The controller is further disposed to select one of the first estimation of engine MAF, when the steady-state operating mode is present, and the second estimation of engine MAF, when the transient mode is present, and use the selected first or second estimation of engine MAF to provide at least one of the compressor bypass command signal, the intake throttle command signal, and the waste-gate command signal.

In yet another aspect, the disclosure describes a method for operating an engine. The method includes calculating competing engine mass air flow (MAF) values based on a regression model and a flow model, the regression model using interpolation between preprogrammed engine calibration operating points acquired during steady state engine operation, the flow model dynamically determining engine MAF based on an estimated flow through engine air system and exhaust system valves based on each valve's effective flow area and pressure difference across each respective valve. The method further includes comparing the competing values of engine MAF and, when a difference between the competing values exceeds a threshold value, selecting the value based on the regression model, determining whether a respective position sensor in the engine air system and exhaust system valves is faulty and, when a fault is present, selecting the value based on the regression model, and determining whether the engine is operating in a steady state or a transient state, such that, when the engine is operating in a steady state for, selecting the value based on the regression model, and, when the engine is operating in a transient state, selecting the value based on the flow model.

DETAILED DESCRIPTION

This disclosure relates to internal combustion engines and, more particularly, to a reliable control of the engine AFR by using two control methods simultaneously and selecting the most accurate estimate between the two methods under the then-present engine operating conditions, alternatively or additionally, the most appropriate calculation method based on any sensor or other diagnosed system failures that may be present, to maintain full power engine functionality without resorting to a limp-home or reduced power mode when a sensor has malfunctioned, as is the case presently. To this end, the disclosure describes systems and methods for the redundant provision of information to the control methods, which can substitute one sensor input for another to yield a robust system that is less susceptible to sensor failures than the systems currently in use.

In one embodiment, the MAF rate of the engine is estimated by two methods. One method is regression estimation. In the regression estimation method, the MAF is estimated based on two absolute pressure inputs, one delta-pressure input, and one temperature input. A regression model is thus setup and calibrated during an engine calibration process, and the regression coefficients are solved according to the steady state calibration points. This can be done for multiple sensor inputs to permit their substitution during service in the event of a sensor failure. The regression model can also be used as the default mode of calculating engine MAF and, thus, AFR.

The second method for calculating MAF is based the position of each of a plurality of engine valves that can affect MAF. For example, the position of an intake throttle valve, an EGR valve, a compressor bypass valve, and a turbine waste-gate valve can all be simultaneously considered to calculate a total air and exhaust gas effective flow area, which is aggregated in a flow circuit to determine all relevant flows in the engine, including fresh MAF entering the engine. A typical inverse flow model can then be used to determine MAF based on various inputs from the engine system including the derived effective flow area, which is based on the position of the various other engine valves, and two absolute pressure sensor (or a delta pressure sensor) inputs—flow will depend on the flow area and the pressure difference across the area causing the fluids to flow from one side to the other.

In one embodiment, each of the two control algorithms is stored and operates in a respective separate module controller associated with the engine. Each separate module controller is configured to execute either a regression model, or an inverse flow model algorithm to control the various valves of the engine and to communicate with a central controller, such as an engine or machine electronic control module (ECM). The engine or machine ECM may thus be designed and programmed to operate with a broad common engine platform that is not tailored for specific application because any diversified applications and configurations for the various engine valves that may be present can be added to the separate module controllers. The communization of the ECM in this fashion presents the opportunity to effectively reduce costs and maintain commonality of the main engine or machine ECM across multiple platforms.

Apart from the operations carried out by the separate module controllers, the main ECM can perform two additional, relevant functions, which include determining whether the regression model or inverse flow model will be utilized to estimate MAF, or whether the mixed model should be used. The main ECM may further determine any offsets that should be applied to other engine valves when one of the valves, e.g., the intake throttle valve, is adjusted according to the required operational change. Such offsets can be used to improve engine system stability.

In an illustrative but non-limiting example, the main ECM may determine that an increase in intake air flow is desired. In response, a sub-control module may decide that that the intake throttle valve should be opened, and send a command to increase the effective flow area of the intake throttle valve. As the throttle valve is adjusted to a more open position, the engine's compressor speed may slow down and provide a lower pressure and amount of intake air to the engine than is desired. Based on input from a compressor outlet pressure sensor, an adjustment to the waste-gate of the turbine may be made to decrease the effective flow area of a waste-gate valve, thereby increasing the rotational speed of compressor and providing greater intake air pressure. Subsequently, this increased speed of compressor may result in more air being supplied to engine, and thus a restricting movement of throttle valve may be required. This sequence of changes may continue until stable operation of engine is achieved.

Instead of undertaking such reactive control, however, with the assistance of the offsets determined by the main ECM, system instability may be reduced by determining a desired adjustment of throttle valve and determining the effect the adjustment will have on the remaining engine valves, in this example, the turbine waste-gate valve and the compressor bypass valve. The main ECM can send these offsets, which can be considered as feed-forward commands, to the various sub-control module(s) of the engine to implement any necessary adjustments simultaneously and in real time.

Figure 1:
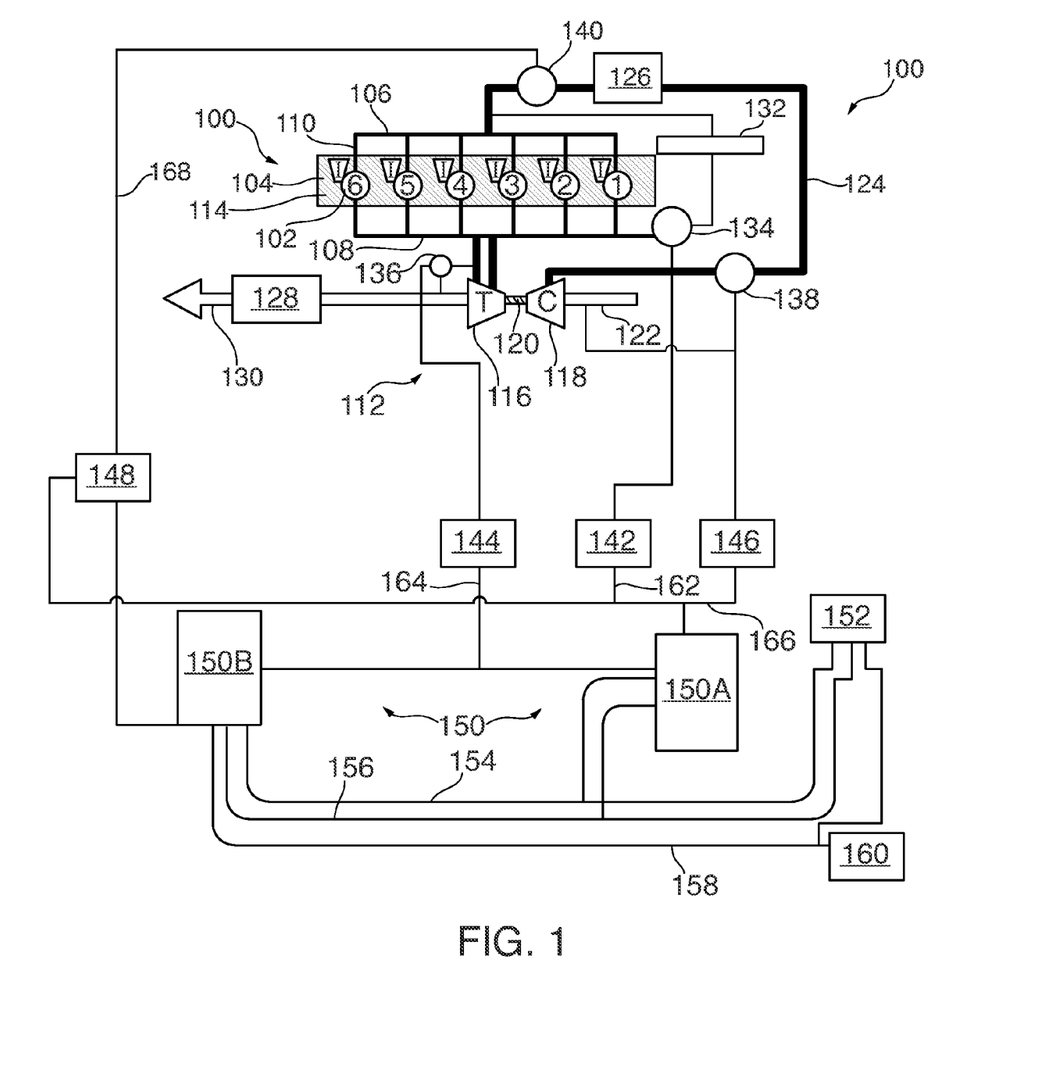
FIG. 1 is a block diagram representation of an internal combustion engine in accordance with the disclosure.

An exemplary embodiment will now be described, but it should be appreciated that engine embodiments having fewer, more or different actuators would work in a similar fashion. A block diagram of an engine 100 having a plurality of combustion cylinders, each of which is discussed herein as a combustion cylinder 102 formed within a cylinder block 104 is shown in FIG. 1. The engine 100 includes an intake manifold 106 and an exhaust collector 108 in fluid communication with each combustion cylinder 102. In the illustrated embodiment, the intake manifold 106 fluidly communicates with each combustion cylinder 102 via intake runners 110 that are fluidly connectable to each combustion cylinder 102 when corresponding intake valves (not shown) are open, in the known fashion. Similarly, the exhaust collector 108 is connectable with each combustion cylinder 102 via exhaust runners 114 through exhaust valves (not shown). Activation of the intake valves and the exhaust valves in the illustrated embodiment can be accomplished by a variable valve activation system, which may include actuators associated with the various valves, with a cam phasing device, and the like. The intake runners and the exhaust runners can be at least partially formed within a cylinder head, which is connected to the cylinder block, but any one of a number of other known engine configurations may be used.

Each combustion cylinder 102 includes a piston that is configured to reciprocate within a corresponding bore formed in the cylinder block. The portion of the bore between the piston and the cylinder head defines a combustion chamber that is generally sealed when combustion of an air/fuel mixture occurs. Air for the air/fuel mixture, which may further include other fluids such as exhaust gas, and/or a gaseous fuel, is provided to the combustion chamber generally through the intake runners 110. Fuel is provided to the combustion chamber from an injector (not shown), which injector may be placed directly in communication with the cylinder or elsewhere, for example, in the intake manifold. In different engines or in alternative embodiments, the injector or another fuel delivery valve may be located elsewhere in the engine such that fuel and air are premixed before being provided to the combustion chamber.

When in the combustion chamber formed in each combustion cylinder 102, the air/fuel mixture is compressed as the piston moves to reduce the volume of the combustion chamber until combustion occurs or is initiated. During combustion, expanding gases push the piston thus generating work, which is transferred to a power output element of the engine. Following combustion, exhaust gas remaining in the combustion chamber is evacuated into the exhaust collector 108 through the exhaust valves.

The illustrated engine embodiment further includes a turbocharger 112 having a turbine 116 and a compressor 118. The turbine 116 is fluidly connected to the exhaust collector 108 and is arranged to receive heated, pressurized exhaust gas therefrom, which passes through the turbine 116 and expands to generate work as it passes over and through a turbine wheel (not shown). The turbine wheel is connected to a compressor wheel via a shaft 120, which compresses air entering the compressor 118 via an air inlet 122. The compressed air passes into an intake conduit 124, which includes an optional intake air cooler 126, and through the intake conduit 124 the compressed air is provided to the intake manifold 106 and to the combustion cylinders 102, as previously described. Exhaust gas exiting the turbine 116 may pass through various after-treatment devices 128 before being expelled through a tailpipe or stack 130.

The illustrated engine embodiment further includes an exhaust gas recirculation (EGR) system. As shown, the EGR system is a so-called high pressure loop system that includes an EGR cooler 132 fluidly interconnected between the exhaust collector 108 and the intake manifold 106, but other EGR system arrangements can be used. The EGR system further includes an EGR valve 134 disposed along a fluid conduit that includes the EGR cooler and configured to meter or otherwise control a flow rate of exhaust gas being recirculated from the exhaust collector 108 to the intake manifold 106. As is known, recirculated exhaust gas may affect the rate of ingestion of fresh air by the engine 100 in that recirculated exhaust gas displaces fresh air consumed by the engine.

Apart from the EGR valve 134, which is one example of a valve that may affect the rate of ingestion of fresh air into the engine, other valves may be present that can affect the amount of engine MAF, for various reasons. For example, in the engine 100, the turbocharger 112 includes a waste-gate valve 136, which essentially operates as a turbine bypass valve. The engine 100 further includes a compressor bypass valve 138. The waste-gate valve 136, when open, routes exhaust gasses around the turbine such that the turbine power is robbed or reduced. Similarly, the compressor bypass valve 138 routes air around the compressor 118 under operating conditions warranting an air bypass, for example, if the compressor is surging. The engine 100 further includes an intake throttle valve 140 disposed along the intake conduit 124. The intake throttle valve 140 is configured to selectively constrict the flow of compressed air, or intake charge, into the intake manifold 106 at a location upstream of the location of introduction of EGR, as shown in FIG. 1.

Each of various engine air and/or exhaust valves on the engine 100 that are shown in FIG. 1 includes a corresponding actuator that effects its operation. In the illustrated embodiment, the EGR valve 134 is controlled by an EGR valve actuator 142, the waste-gate valve 136 is controlled by a waste-gate actuator 144, the compressor bypass valve 138 is controlled by a compressor bypass valve actuator 146, and the intake throttle valve 140 is controlled by an intake throttle valve actuator 148. Any or all of these actuators may operate according to known actuator activation methods, including electrical, hydraulic, pneumatic, mechanical modes of power, and the like. Each actuator is communicatively associated with an electronic controller 150.

The electronic controller 150 may be a single controller or may include more than one controller disposed to control various functions and/or features of the engine 100 and/or a machine in which the engine is installed. For example, a master controller 152, used to control the overall operation and function of the engine 100, in the illustrated embodiment, or in general, a vehicle, machine or stationary application may be cooperatively implemented with an engine controller used to control the engine 100. In this embodiment, the term "controller" is meant to include one, two, or more controllers that may be associated with the engine 100 and that may cooperate in controlling various functions and operations. The functionality of the controller, while shown and described conceptually herein to include various discrete functions for illustrative purposes only, may be implemented in hardware and/or software without regard to the discrete functionality shown. Accordingly, various interfaces of the controller are described relative to components of the engine in the block diagram of FIG. 1, and in the figures that follow. Such interfaces are not intended to limit the type and number of components that are connected.

In the illustrated embodiment, the controller 150 is embodied as two sub-modules, i.e., a first module 150A and a second module 150B. The first module 150A and the second module 150B are communicatively connected to one another via a first link 154 and a second link 156. A third link 158 is connected to a power source 160 and powers the first module 150A, the second module 150B, and the master controller 152. The master controller 152 also accesses the first link 154 and the second link 156 to allow for two-way communications between the master controller 152 and the first module 150A, the master controller 152 and the second module 150B, and also the first and second modules 150A and 150 B independently from the master controller 152. In certain instances, all three controllers, i.e. the first module 150A, the second module 150B and the master controller 152, may communicate together and share the same information.

The first and second links may be embodied as any appropriate analog or digital communication mode. In the illustrated embodiment, the first and second links are embodied as computer area network (CAN) connections, for example, conforming to the CAN/J1939 standard, but other communication protocols may be used. In one contemplated embodiment, the master controller 152 may be common across numerous engine platforms, and the particular actuators on each separate engine application, which may differ between engine applications, may be addressed by customizing the modules 150A and 150B. Moreover, to the extent that two separate methods are used to calculate or otherwise determine engine MAF, each of the modules 150A and 150B can run one (or both) of the two calculation methods, and provide MAF recommendations to the master controller 152, who will select the value that will be used during engine operation. The master controller 152, which can control engine fuelling, may thus control engine AFR based on MAF information provided by controller 150 and fuelling information originating from within the master controller 152.

Returning now to FIG. 1, each actuator may further include a position sensor or other indicator of the position of the respective valve being controlled. Information about the desired or commanded activation of each respective actuator, as well as, optionally, feedback information on the position of each respective valve as determined at the respective actuator, may be exchanged between each respective actuator and the module 150A, 150B and/or the master controller 152. Specifically, EGR valve commands and feedback on the position of the EGR valve may be exchanged between the EGR valve actuator 142 and the controller 150 via an EGR line 162. Information about the waste-gate may be provided via the waste-gate line 164, information about the compressor bypass may be provided via the compressor bypass line 166, and information about the intake throttle valve may be provided via the intake throttle line 168.

Figure 2:
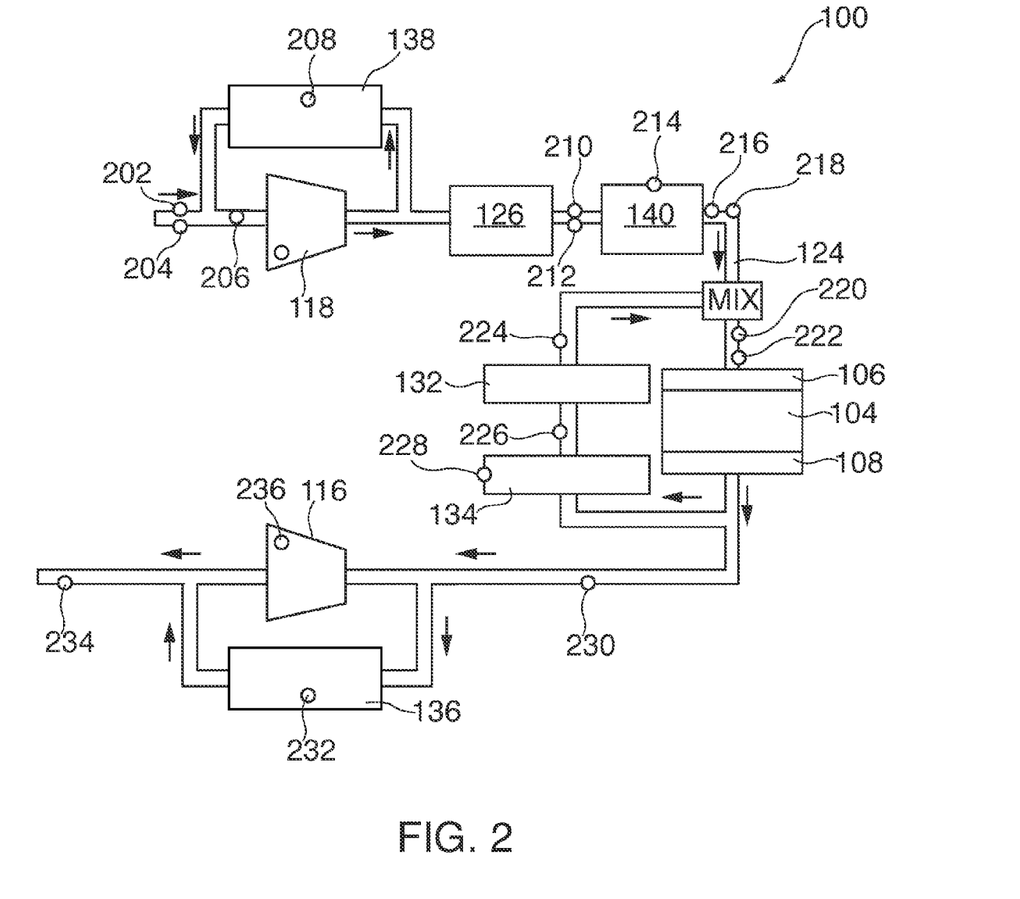
FIG. 2 is a schematic diagram of an engine system that includes various electronic control modules and sensors in accordance with the disclosure.

Apart from the optional valve position information, a variety of other signals indicative of engine operating parameters are available to the controller 150 and master controller 152. FIG. 2 is a schematic view of the engine 100 from a different perspective to illustrate and identify various sensors that may be placed in various locations on the engine and its related structures. In reference to FIG. 2, where like structures and elements as corresponding structures and elements previously described are denoted by the same reference numerals as previously used in FIG. 1 for simplicity, various sensors are shown. Accordingly, the engine 100 may include various sensors, as shown in Table 1 below, in which the various sensors, the parameter measured by each, and a reference numeral corresponding to the location along the various engine fluid paths as shown in FIG. 2 are listed:

TABLE 1

| Sensor | Parameter Indicated | Ref. (FIG. 2) |
|---|---|---|
| Ambient Pressure | Pressure of engine intake air (compressor inlet pressure) | 202 |
| Ambient Temperature | Temperature of engine intake air | 204 |
| Compressor Inlet P | Compressor inlet pressure | 206 |
| Compressor Delta P | Pressure difference across compressor | 208 |
| Charge Air T | Temperature of charge air | 210 |
| Charge Air P | Pressure of charge air (compressor outlet pressure) | 212 |
| Throttle Delta P | Pressure difference across intake throttle valve | 214 |
| Throttle T | Air temperature at outlet of intake throttle valve | 216 |
| Throttle P | Air pressure at outlet of intake throttle valve | 218 |
| IMAT | Intake manifold air temperature | 220 |
| IMAP | Intake manifold air pressure | 222 |
| EGR-T | Post-EGR cooler gas temperature | 224 |
| EGR-P | EGR system pressure | 226 |
| EGR Delta P | Pressure difference across EGR valve | 228 |
| EBP | Exhaust pressure | 230 |
| Turbine Delta P | Pressure difference across turbine | 232 |
| Exhaust Out P | Turbine outlet pressure | 234 |
| Turbine SPD | Turbine wheel speed | 236 |

As can be appreciated, fewer and/or more parameters and sensors that those listed in Table 1 can be used depending on the configuration of each engine.

By use of these and, possibly, other or different parameters, two flow models can be used to effect a coordinated control of the various engine valves that may affect engine MAF. In the illustrated embodiments, coordinated control can be carried out for the intake throttle valve 140, the EGR valve 134, the compressor bypass valve 138 and the waste-gate valve 136. Each of the two flow models can be used to estimate airflow passing through additional valves, if those are installed on the engine, in the same way the flow is calculated for the valves shown in the described exemplary embodiments. Examples of additional valves that may be mounted on the engine can include balance valves disposed between turbochargers connected in parallel, bypass valves disposed between series turbocharger configurations, and other examples.

An exemplary flow rate model for controlling the EGR valve 134 is given below in Equation 1 as a specific example of a regression map control method:

$$\text{Measured } EGR = \alpha_0 + \alpha_1 \text{Abs\_P} + \alpha_2 \text{Delta\_P} + \alpha_3 P_3 + \\ \alpha_4 T + \alpha_5 \text{Abs\_P}^2 + \alpha_6 \text{Delta\_P}^2 + \alpha_7 P_3^2 + \alpha_8 T^2 + \\ \alpha_9 \text{Abs\_P} \times \text{Delta\_P} + \alpha_{10} \text{Abs\_P} \times P_3 + \alpha_{11} \text{Abs\_P} \times T + \\ \alpha_{12} \text{Delta\_P} \times P_3 + \alpha_{13} \text{Delta\_P} \times T + \alpha_{14} P_3 \times T \quad \text{Equation 1}$$

In Equation 1, Abs_P indicates an (absolute) air pressure reading from the IMAP sensor 222, the EGR gas pressure sensor 226, the Compressor outlet pressure sensor 212, or the intake throttle outlet pressure sensor, shown as Throttle P 218 in Table 1. Depending on the values selected for the coefficients, which are denoted as $\alpha_i$. Any one of four inputs is valid for the absolute pressure. Similarly, in Equation 1, Delta_P denotes a (gauge) pressure reading from a delta-pressure sensor, which is shown as EGR Delta P 228 in Table 1, and which is located along the EGR conduit such as an EGR venturi device, or a EGR system pressure 226. $P_3$ is another pressure reading in the calculation and can denote an absolute pressure reading from the MAP sensor 222, the EGR gas pressure sensor 226, the compressor outlet pressure sensor 212, or the Throttle outlet pressure sensor, which is shown as Throttle P 218 in Table 1. Any one of four inputs is valid T could be a temperature reading from a temperature sensor that is located in the intake manifold such as IMAT 220 or EGR gas conduit temperature 224. Any one of two inputs is valid in the illustrated embodiment for the regression model, the Abs_P is the EGR system pressure 226, Delta_P is pressure difference across the EGR valve, denoted as 228 in FIG. 2, $P_3$ is IMAP 222, and T is the EGR cooler outlet temperature 224. It is noted that, for this embodiment of the regression model, the EGR valve position is not included.

During engine calibration, the regression coefficients shown in Equation 1 can be solved by the least square methods or other regression methods known in the art, in accordance with the operation shown in Equation 2 below:

$$\begin{bmatrix} 1 & x_{1,2} & x_{1,3} & \ldots & x_{1,15} \\ 1 & x_{2,2} & x_{2,3} & \ldots & x_{2,15} \\ 1 & x_{3,2} & x_{3,3} & \ldots & x_{3,15} \\ \vdots & & & & \\ 1 & x_{k,2} & x_{k,3} & \ldots & x_{k,15} \end{bmatrix} \times \begin{bmatrix} \alpha_0 \\ \alpha_1 \\ \vdots \\ \alpha_{14} \end{bmatrix} = \begin{bmatrix} Y_1 \\ Y_2 \\ Y_3 \\ \vdots \\ Y_k \end{bmatrix} \quad \text{Equation 1}$$

In Equation 2, "Y" indicates a derived level of EGR during steady state operation of the engine. The derived EGR level indicates the rate or ratio of exhaust gas to fresh air ingested by the engine during operation at steady state calibration points, which can be determined by any suitable method, for example, based on $CO_2$ measurements comparing concentrations between engine intake air and exhaust. Still relative to Equation 2, in the illustrated embodiment, "X" is a sensor reading input that can be measured during the engine calibration process, and "α" indicates coefficients.

The same regression control method illustrated above for the EGR valve can apply equally to other engine valves such as the intake throttle valve 140, the compressor bypass valve 138, and the turbine waste-gate valve 136. The various possible parameters (see Table 1) that can be used in a regression model similar to Equation 1 but for each of these valves is provided in Table 2 below:

TABLE 2

| Valve | "Abs P" | "Delta P" | $P_3$ | T |
|---|---|---|---|---|
| EGR valve 134 | IMAP 222<br>EGR-P 226<br>Charge Air P 212<br>Throttle P 218 | EGR Delta P 228 | IMAP 222<br>EGR-P 226<br>Charge Air P 212<br>Throttle P 218 | IMAT 220<br>EGR-T 224 |
| Intake Throttle Valve 140 | IMAP 222<br>Charge Air P 212<br>Throttle P 218 | Throttle Delta P 214 | IMAP 222<br>Charge Air P 212<br>Throttle P 218 | Charge Air T 210<br>Throttle T 216 |
| Compressor Bypass Valve 138 | IMAP 222<br>Charge Air P 212<br>Throttle P 218 | Compressor Delta P 208 | IMAP 222<br>Charge Air P 212<br>Throttle P 218 | Charge Air T 210<br>Throttle T 216 |
| Waste-Gate Valve 136 | IMAP 222<br>Charge Air P 212<br>Throttle P 218 | Turbine Delta P 232<br>Throttle Delta P 214<br>Compressor Delta P 208 | IMAP 222<br>Charge Air P 212<br>Throttle P 218 | Charge Air T 210<br>Throttle T 216 |

Certain of the parameters in Table 2 above may be measured directly, or they may otherwise be determined either from virtual device models, for example, a virtual pressure difference calculation, or by comparing known system pressures to determine pressure differences that are correlated to the desired pressure difference value that is considered. For example, the intake throttle pressure difference can be related to a difference between the pressure measured at a location upstream of the intake throttle valve, and a second pressure measurement at a location downstream of the intake throttle valve. For example, the pressure difference across the intake throttle valve can be related to a difference between the compressor outlet pressure (charge air P, 212) and the throttle outlet pressure (Throttle P, 218). Similarly, the compressor pressure difference (Compressor Delta P, 208) can be calculated as a difference between Ambient Pressure 202 and Charge Air P 212.

With the regression model (Equations 1 and 2) being the first method for calculating flows, a second method for calculating flows uses a flow model that is based on valve effective area and valve position sensor inputs. Such flow models can apply predetermined flows passing through a known opening, which is denoted by the valve position, at a known pressure difference across the opening. For example, Table 3 below lists the various parameters that can be used to estimate the flow through the various valves of the system:

TABLE 3

| Valve | Position Sensor | Delta P |
|---|---|---|
| EGR Valve 134 | Estimated valve effective area | EGR Delta P 228 |
| Intake Throttle Valve 140 | Estimated valve effective area | Throttle Delta P 214 |
| Compressor Bypass Valve 138 | Estimated valve effective area | Compressor Delta P 208 |
| Waste-gate Valve 136 | Estimated valve effective area | Turbine Delta P 214 |

As before, in the event a particular Delta P measurement is not available, the relevant parameter can be calculated based on other, available parameter measurements, determinations and/or estimations.

The two alternative methods of calculating valve flow, i.e., the regression model (Equations 1 and 2) and the flow model (Table 3), can be carried out simultaneously and continuously during engine operation to provide a dual indication of air flow passing through the various valves and, in general, the fresh air passing through the engine and the fresh air ingested by the engine. To illustrate, if the various flows of fluids through the various valves is known, as denoted by the arrows in FIG. 2, any other flows can be calculated. For example, fresh air flow through the engine will be the difference between the intake throttle flow and the EGR flow. The controller 150 and/or master controller 152 can thus select which flow estimate to use to control the engine based on a number of operating conditions.

The various equations and calculations discussed above may be present in the various controllers and stored in non-volatile memory of the controller in the form of computer executable instructions. During operation, the computer executable instructions may be used to receive relevant information and parameters, perform operations, determine coefficients and constants, determine resulting, calculated parameters, and communicating these parameters to appropriate circuits and device drivers effecting physical changes in actuators of the engine.

INDUSTRIAL APPLICABILITY

The present disclosure is applicable to internal combustion engines of any type and for any application. In the illustrated embodiments, the engine described is shown as having various actuators, sensors and controllers, but it should be appreciated that different actuators, sensors and controllers may be used.

The systems and methods described herein are applicable for determining engine MAF for use in a reliable AFR calculation. A first Method 1, which may be based on a calibrated, steady-state regression estimation as discussed above (Equations 1 and 2), can be used when the engine is operating in a steady state, and also in a quasi-steady state. The regression estimation is based on many different sensor inputs, some of which are interchangeable and can be substituted for one another in the event a sensor failure in the engine is determined. In this way, a group of engine parameters can be selected and calibrated for each control (see Table 2) such that any particular parameter within the corresponding group can be substituted for any other parameter in that same group to effect valve operation. Although a particular method for carrying out the regression estimation is shown above, any other known, appropriate method can be used.

Regarding interchangeability of sensor inputs, for example, as shown in Table 2, failure of the IMAP sensor can cause the controller to use the compressor pressure instead without loss of engine functionality, provided that the various factors that go into the regression calculation have been predetermined at the calibration stage. Because inaccuracies may be present in the regression estimation when the engine is not operating in a steady state, a second model, Model 2, which is based on flow estimates thought known orifices and a determined pressure difference, can be used. Again, the parameters that are useable in the flow estimation are interchangeable such that they can be substituted in case of a sensor failure. In general, whether the estimate based on Method 1 or Method 2 is used to control engine operation depends on a selection that is made in a controller based on the engine operating conditions.

Figure 3:
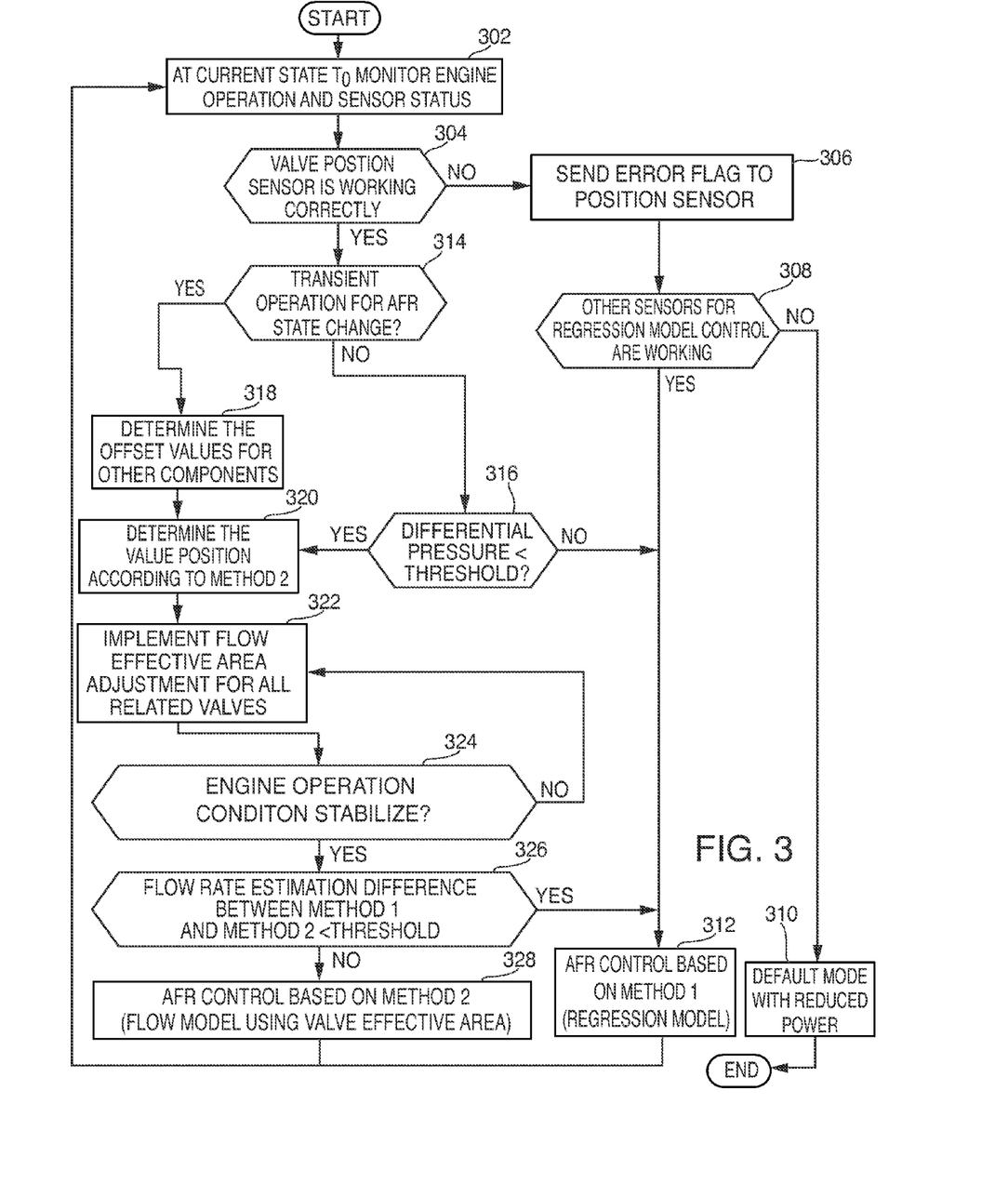
FIG. 3 is a flowchart for a method of operating an engine in accordance with the disclosure.

A flowchart for a method of estimating engine MAF under different engine conditions is shown in FIG. 3. At initiation of engine operation, engine operation and sensor status is monitored and determined by an electronic controller at 302. This process can be done for each actuator individually, or for all actuators at the same time. Because valve position is relevant to Method 2 (flow model), an examination of whether the relevant position sensors are operating is made at 304. When a position sensor is not operable, the process includes setting an error flag at 306 and determining whether sensors required to operate Method 1 (regression model) are functional at 308. If the necessary sensors to operate the Method 1 are not functional, the process implements a limp-home or reduced power operating mode for the engine at 310, and the process ends. If, however, sensors are operational, the process implements AFR control based on Method 1 (regression model) at 312, and the process repeats at 302.

Under normal operation, i.e., when all sensors including the position sensors are functional, the process continues with a determination of whether a transient event is present at 314. When no transient operation is present, a determination is made on whether a pressure difference across the valve of interest that is less than a threshold is present at 316. When pressure difference is below the threshold, the ratio of signal to noise might dramatically increase. When a pressure difference is determined to exceed a threshold, the process reverts to operation under Method 1 (regression model), otherwise, the controller determines valve position at 320 according to Method 2.

When a transient change is occurring at 314, the system calculates offset values for other components at 318. These offset values are pre-calculated changes in the position of various other valves in the engine that are consonant with a change in the control valve and promote engine stability. For example, if the MAF control determines that a reduction in MAF is desired and is controlling the intake throttle valve, it commands the intake throttle to close. By doing so, air passing through the compressor decreases, which may cause a surge. Thus, when the intake throttle is adjusted, and offset is applied to the compressor bypass valve that causes the compressor to maintain operating efficiency. A similar offset is applied to the waste-gate valve when the EGR valve is adjusted, and vice versa.

From operating in Method 2 at 320, including the offsets calculated at 318, the controller implements a flow effective area adjustment for all related valves in the engine at 322, and checks for stabilization in engine performance at 324 for a period, e.g., 5 minutes. If the engine operation has not stabilized in this time, the valve positions are readjusted at 322. If the engine has stabilized, the process continues with the controller determining the difference between MAF estimations based on Method 1 and Method 2, which are run concurrently, at 326. When the difference between the flow estimations between Method 1 and Method 2 exceeds a threshold, Method 2 (flow model) operation is selected and the process proceeds to 328. When the difference is less than a threshold, e.g., 5%, the process reverts to 312, and implements AFR control based on Method 1 (regression model), and the process repeats beginning at 302.

When the process shown in the flowchart of FIG. 3 is operated, various engine conditions are reliably and robustly addressed. For example, when differential pressure across the valve is low and cannot be reliably and accurately determined, Method 2 (flow model) is used, which also depends on valve opening. During transient events, Method 2 (flow model) is utilized to avoid time lag due to sensors. The engine master ECM can directly apply offsets to stabilize the system quickly. During steady state events, Method 1 (regression map) is used to provide flow estimation to avoid any errors introduced by changing flow conditions through the valve effective area. Component wear and manufacturing variability may cause the effective area estimation to be inaccurate under such conditions. When certain sensors show a fault flag, the master engine ECM will identify a substitute sensor, or an alternative method. For example, a valve position sensor fails, Method 1 (regression map), which does not depend on position, will be used for engine operation and permit normal engine operation to be carried out. When the engine operates at a steady state condition, if the estimated flow rates based on the two methods are close (i.e., their difference is below a threshold), Method 1 is preferred because pressure and temperature sensors can filter out noise more effectively at high MAF conditions of the engine.

Figure 4:
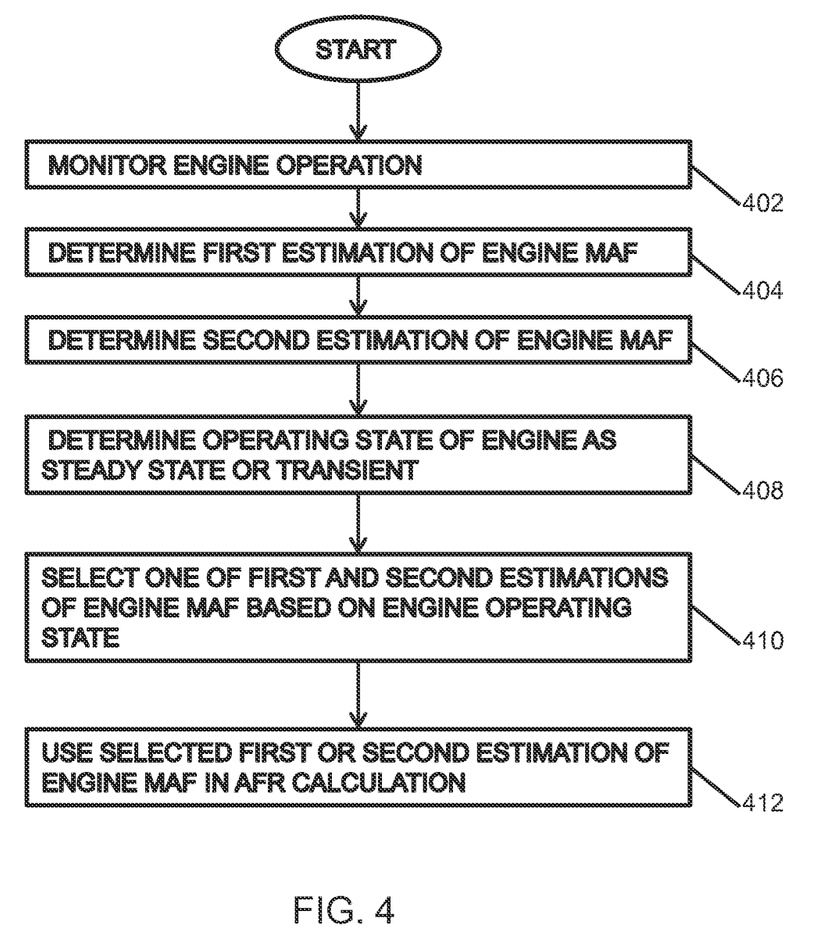
FIG. 4 is a flowchart for a method of determining an engine mass air flow (MAF) in accordance with the disclosure.

A flowchart for a method of determining an engine mass air flow (MAF) for use in an engine air to fuel ratio (AFR) calculation to operate an engine is shown in FIG. 4. The method includes monitoring engine operation at 402. The monitoring can be carried out with an electronic controller and includes monitoring a first group of engine parameters, the first group being related to fluid pressures at various engine locations, and a second group of engine parameters, the second group being related to valve positions of various engine actuators. The method further includes determining in the electronic controller a first estimation of engine MAF at 404, which may be based on one parameter from the first group of engine parameters, and determining in the electronic controller a second estimation of engine MAF at 406, which may be based on one parameter from the second group of engine parameters. The method also includes determining in the electronic controller an operating state of the engine at 408, the operating state of the engine being determined as steady-state or transient, and selecting one of the first estimation of engine MAF and the second estimation of engine MAF based on the operating state of the engine at 410. The selected first or second estimation of engine MAF is used in the AFR calculation at 412, in the electronic controller, to control the engine.

Figure 5:
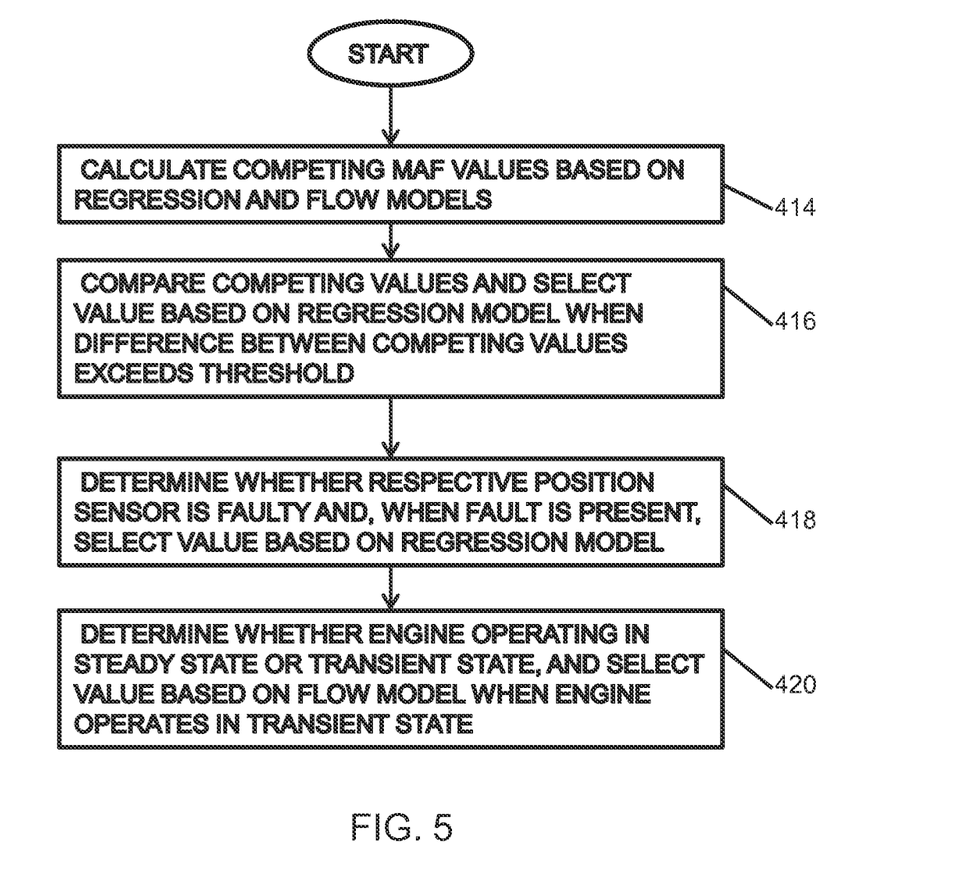
FIG. 5 is a flowchart for a method of operating an engine in accordance with the disclosure.

A flowchart for a method of operating an engine is shown in FIG. 5. The method includes calculating competing engine mass air flow (MAF) values at 414. The values may be calculated based on a regression model and a flow model, the regression model using interpolation between preprogrammed engine calibration operating points acquired during steady state engine operation, the flow model dynamically determining engine MAF based on an estimated flow through engine air system and exhaust system valves based on each valve's effective flow area and pressure difference across each respective valve. The method also includes comparing the competing values of engine MAF and, when a difference between the competing values exceeds a threshold value, selecting the value based on the regression model at 416. The method further includes determining whether a respective position sensor in the engine air system and exhaust system valves is faulty and, when a fault is present, selecting the value based on the regression model at 418, and determining whether the engine is operating in a steady state or a transient state, such that, when the engine is operating in a steady state for, selecting the value based on the regression model, and, when the engine is operating in a transient state, selecting the value based on the flow model at 420.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A method for determining an engine mass air flow (MAF) for use in an engine air to fuel ratio (AFR) calculation to operate an engine, the method comprising:
    monitoring engine operation with an electronic controller, the monitoring including monitoring a first group of engine parameters and a second group of engine parameters, the first group being related to fluid pressures at various engine locations, the second group being related to valve positions of various engine actuators;
    determining, with the electronic controller, a first estimation of engine MAF based on one parameter from the first group of engine parameters;
    determining, with the electronic controller, a second estimation of engine MAF based on one parameter from the second group of engine parameters;
    determining, with the electronic controller, an operating state of the engine, the operating state of the engine being determined as steady-state or transient;
    selecting one of the first estimation of engine MAF and the second estimation of engine MAF based on the operating state of the engine; and
    using the selected one of the first estimation of engine MAF or the second estimation of engine MAF in the engine AFR calculation to operate the engine,
        wherein the engine AFR calculation is performed with the electronic controller.

2. The method of claim 1, wherein the first estimation of engine MAF is based on a regression map, which is calibrated at a plurality of steady state engine operating conditions.

3. The method of claim 2, wherein the first group of engine parameters includes at least two of engine intake manifold pressure, exhaust gas recirculation system pressure, compressor outlet pressure, intake throttle outlet pressure, a pressure difference across an engine intake and exhaust systems, a pressure difference across an engine intake throttle, a pressure difference across an engine compressor, and a pressure difference across an engine turbine.

4. The method of claim 2, wherein any two engine parameters in the first group of engine parameters can be used interchangeably by the controller to determine the first estimation of engine MAF.

5. The method of claim 4, wherein determining the first estimation of engine MAF is further based on a pressure difference signal and a temperature signal.

6. The method of claim 1, wherein selecting one of the first estimation of engine MAF and the second estimation of engine MAF includes selecting the first estimation of engine MAF by default when the engine is operating in a steady state.

7. The method of claim 1, wherein selecting one of the first estimation of engine MAF and the second estimation of engine MAF includes selecting the first estimation of engine MAF by default when a position sensor failure has been diagnosed in the engine.

8. The method of claim 1, further comprising comparing the first estimation of engine MAF with the second estimation of engine MAF to determine a difference, and wherein, when the difference exceeds a threshold value, selecting one of the first estimation of engine MAF and the second estimation of engine MAF includes selecting the first estimation of engine MAF.

9. The method of claim 1, wherein the second estimation of engine MAF is based on a flow model and a pressure difference signal indicative of a pressure difference across the valve,
    wherein the flow model calculates a flow of fluid through a valve based on a valve position signal, and
    wherein the valve position signal correlated with a valve flow effective area.

10. The method of claim 9, wherein the second group of engine parameters includes:
    at least one of a pressure difference across an exhaust gas recirculation (EGR) cooler, a pressure difference across an intake throttle valve, a pressure difference across a compressor, and a pressure difference across a turbine; and at least one of a position signal of an EGR valve, an intake throttle valve, a compressor bypass valve, and a waste-gate valve associated with the turbine.

11. The method of claim 10, wherein any two of the at least one of a pressure difference across an exhaust gas recirculation (EGR) cooler, a pressure difference across an intake throttle valve, a pressure difference across a compressor, and a pressure difference across a turbine engine parameters can be used interchangeably to determine the second estimation of engine MAF.

12. The method of claim 9, wherein any two of the at least one of the position signal of an EGR valve, an intake throttle valve, a compressor bypass valve, and a waste-gate valve associated with the turbine can be used interchangeably to determine the second estimation of engine MAF.

13. The method of claim 1, wherein selecting one of the first estimation of engine MACH and the second estimation of engine MAF includes selecting the second estimation of engine MAF when the engine is operating in a transient state.

14. The method of claim 1, further comprising determining offsets for the various engine actuators based on the selected first estimation of engine MAF or the selected second estimation of engine MAF in the engine AFR calculation in the controller to operate the engine.

15. An internal combustion engine having at least one cylinder fluidly connectable between an intake manifold and an exhaust collector, the engine thriller comprising:

a turbocharger having a compressor in fluid communication with the intake manifold and a turbine in fluid communication with the exhaust collector;

a compressor bypass valve disposed to fluidly bypass the compressor, the compressor bypass valve being associated with a compressor bypass valve actuator responsive to a compressor bypass command signal and providing a compressor bypass position signal being indicative of an operating position of the compressor bypass valve;

a waste-gate valve disposed to fluidly bypass the turbine, the waste-gate valve being associated with a waste-gate valve actuator responsive to a waste-gate command signal and providing a waste-gate position signal being indicative of an operating position of the waste-gate valve;

an intake throttle valve disposed in fluid communication with the intake manifold and the compressor, the intake throttle valve being associated with an intake throttle actuator responsive to an intake throttle command signal and providing an intake throttle position signal being indicative of an operating position of the intake throttle valve;

a compressor outlet pressure sensor providing a compressor outlet pressure signal;

an intake throttle pressure sensor providing an intake throttle pressure signal;

an intake manifold pressure sensor providing an intake manifold pressure signal;

an intake manifold temperature sensor providing an intake manifold temperature signal; and a controller programmed to receive and monitor the compressor bypass position signal, the waste-gate position signal, the intake throttle position signal, the compressor outlet pressure signal, the intake throttle pressure signal, and the intake manifold temperature signal, the controller being further programmed to:

determine a first estimation of engine MAF based on one of the compressor outlet pressure signal, the intake throttle pressure signal, the intake manifold pressure signal, and also the intake manifold pressure signal using a regression map;

calculate a pressure difference across the compressor and a pressure difference across the intake throttle based on the compressor outlet pressure signal, the intake throttle pressure signal, and the intake manifold pressure signal;

determine a second estimation of engine MAF based on one of the pressure difference across the compressor and a pressure difference across the intake throttle, along with one of the compressor bypass position signal and the waste-gate position signal using a preprogrammed flow model;

determine an operating state of the engine as between a steady-state operating mode and a transient operating mode;

selecting one of the first estimation of engine MAF and the second estimation of engine MAF, the first estimation of engine MAF being selected when the steady-state operating mode is present, and the second estimation of engine MAF being selected when the transient mode is present; and using the selected first estimation of engine MAF or second estimation of engine MAF to provide at least one of the compressor bypass command signal, the intake throttle command signal, and the waste-gate command signal.

16. The internal combustion engine of claim 15, further comprising:

an exhaust gas recirculation (EGR) valve disposed to selectively fluidly interconnect the intake manifold with the exhaust collector;

an EGR valve actuator associated with the EGR valve, the EGR valve actuator being responsive to an EGR valve command signal and providing an EGR valve position signal that is indicative of an operating position of the EGR valve;

an EGR pressure sensor disposed between the EGR valve and the exhaust collector, the EGR pressure sensor providing an EGR pressure signal;

wherein the controller is further programmed to receive and monitor the EGR valve position signal and the EGR valve pressure signal; and wherein the controller is further programmed to:

determine the first estimation of engine MAF also based on the EGR pressure signal;

calculate a pressure difference across the EGR valve based on the EGR pressure signal and one of the intake throttle pressure signal and the intake manifold pressure signal; and determine the second estimation of engine MAF further based on the pressure difference across the EGR valve.

17. The internal combustion engine of claim 16, wherein the controller is further programmed to provide the intake throttle command signal based on the selected first estimation of engine MAF or the selected second estimation of engine MAF, and to provide the compressor bypass command signal, the waste-gate command signal, and the EGR valve command signal based on a respective preprogrammed offset that is determined or selected based on the intake throttle command signal.

18. The internal combustion engine of claim 15, wherein the controller is further programmed to monitor the compressor outlet pressure sensor, the intake throttle pressure sensor, and the intake manifold pressure sensor for a fault and, when a fault is present, to substitute a failed sensor signal for a remaining pressure signal of an operating sensor with no faults.

19. The internal combustion engine of claim 16, wherein the controller is further programmed to monitor the compressor bypass position signal, the intake throttle position signal, the EGR valve position signal, and the waste-gate position signal for a fault and, when a fault is present, to select the first estimation of engine MAF.

* * * * *